May 17, 1938.    C. W. SHAW    2,117,369

VENTING AND CLOSURE DEVICE

Filed Feb. 18, 1936

INVENTOR.
CLARENCE W. SHAW
BY
Kwis, Hudson & Kent
ATTORNEYS.

Patented May 17, 1938

2,117,369

UNITED STATES PATENT OFFICE 2,117,369

VENTING AND CLOSURE DEVICE

Clarence W. Shaw, Detroit, Mich., assignor, by mesne assignments, to Eaton Manufacturing Company, Cleveland, Ohio, a corporation of Ohio Application February 18, 1936, Serial No. 64,541

6 Claims. (Cl. 220—44)

This invention relates to an improved venting device for liquid containers, such as the fuel tanks of motor vehicles, and more particularly to venting means of this character which is adapted to be readily incorporated in a tank filler cap.

The present invention is directed to the correction of a certain difficulty heretofore experienced in connection with the fuel tanks of motor vehicles. In many motor vehicles the fuel tank air vent is located in the tank filler cap and in some instances this cap is only a few inches above the top of the tank. When the vehicle is traveling in a curved path, as for instance in turning a corner, the fuel level assumes an angle to the horizontal substantially proportional to the angular velocity of the vehicle. Under this condition the fuel level may tend to rise above the level of the filler cap and some of the fuel may be forced through the vent opening, with a resulating loss of fuel and an unsightly collection of dirt on the vehicle structure adjacent the filler cap. As will appear more fully hereinafter, I have been able to correct this difficulty by the provision of improved vent means wherein the flow of air into the tank is relatively unrestricted but the flow of fluid out of the tank is materially restricted.

It is therefore an object of the present invention to provide improved vent means for fuel or other liquid containing tanks which readily permits air to enter the tank but offers material resistance to the flow of air or liquid out of the tank.

A further object is to provide improved vent means, of the type referred to, wherein a body of permeable material extends across the vent opening such that fluid passing into or out of the tank through the vent opening must pass through the permeable material.

Still another object of this invention is to provide improved vent means, of the type referred to, wherein at least a portion of the body of permeable material is movable relative to a member containing a vent opening, such that a larger area of the permeable material is acted upon by fluid passing into the tank than is acted upon by fluid flowing out of the tank.

It is also an object of this invention to provide an improved tank filler cap having the above mentioned novel vent means incorporated therein.

Other objects and advantages of the invention will be apparent from the following description when taken in conjunction with the accompanying sheet of drawings, wherein Fig. 1 is a bottom plan view, with parts broken away, showing a tank filler cap embodying my invention.

I have already indicated that my improved venting means may be applied to fluid containing tanks in general but, since it is particularly adaptable to the fuel tanks of motor vehicles and to the filler caps therefor, I have illustrated my invention in a form applicable to such tanks, but it will be understood of course that this is by way of example only and that the invention may be embodied in other structures and applied to other uses.

Figure 1:
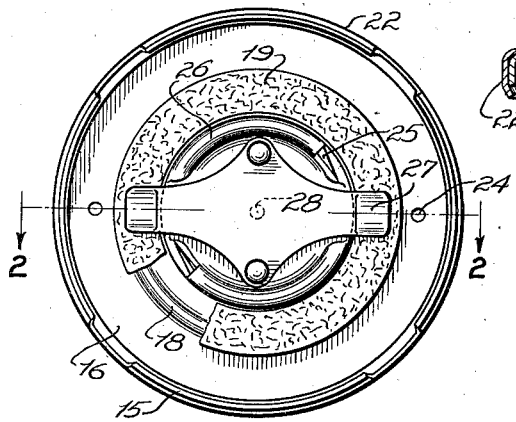
Figure 2:
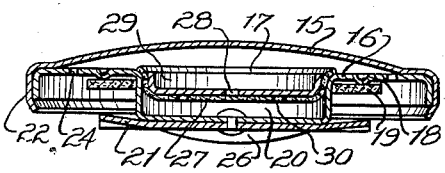
Fig. 2 is a transverse sectional view thereof taken on line 2—2 of Fig. 1.
Figures 3, 4:
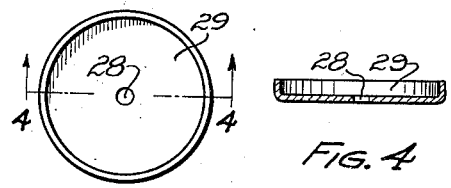
Fig. 3 is a detached plan view of a well forming part of my improved filler cap.
Fig. 4 is a transverse sectional view thereof taken on line 4—4 of Fig. 3.

When my novel vent means is to be incorporated in a filler cap, the cap may be one of the bayonet or quick detachable type, such as that illustrated in Figs. 1 and 2 of the drawing. Such a filler cap may comprise outer and inner shells or body members 15 and 16 with a vent chamber 17 therebetween. The inner member may have a transverse annular part 18 providing a seat for the gasket 19, and may have an axially extending central hollow cup portion 20 which forms a pilot adapted to enter the opening of the filler neck and which also provides a support or carrier for the transverse resilient locking bar 21. The outer member 15 may be of any suitable shape, for example it may be a cup-like member with a top wall of rounded and pleasing appearance as illustrated in Figs. 1 and 2. The outer member may be mounted on the inner member and retained thereon by means of a marginal skirt 22, which may be provided on the outer member and crimped around the outer edge of the inner member.

For venting the tank or container to which this filler cap may be applied, the chamber 17 may be connected to atmosphere by one or more vent openings 24 formed through the inner body member 16 at a point laterally outwardly of the sealing gasket 19. The interior of the hollow pilot cup 20 may be connected with the interior of the fuel or liquid containing tank by means of baffled openings 25 formed through the wall of the depending arcuate lips 26 of the pilot cup. The cap structure and the vent means thereof as thus far described are generally similar to those disclosed in U. S. Patent No. 1,946,768, issued February 13, 1934.

According to my invention I provide means for controlling the flow of fluid through the vent passages such that the flow of air into the tank may take place relatively freely, but such that the flow of air or liquid out of the tank will be materially restricted. As one form of this novel vent means I have shown, in Figs. 1 and 2 of the drawing, a body or flexible disk 27 of porous or permeable material which is arranged to extend transversely of a vent opening or passage 28, such that flow of fluid into or out of the tank through such vent opening must pass through the permeable material. The permeable material may be associated with any one of the vent openings of the cap structure, but is preferably associated with the vent opening 28 formed in a cup-like member 29 which extends transversely of the hollow pilot cup 20. When the body of permeable material is arranged in this manner it may be conveniently held in the desired assembled position in the cap structure, as shown in Fig. 2, by the cup member 29 acting as a retainer which clamps the edge portions of the permeable disk against portions of the wall of the pilot cup.

The vent control disk or body 27 may be formed of chamois skin or any other suitable permeable material. I have found chamois skin to serve very well as the permeable body or disk because it is highly flexible and because it possesses a satisfactory degree of porosity. The permeable disk is located inwardly of the transverse wall formed by the cup member 29, but is preferably located in immediate contact therewith such that fluid acting against the permeable material from the tank to which the cap is applied will tend to press the disk against this transverse wall, and air pressure acting against the disk through the vent opening 28 will tend to flex the disk away from such transverse wall. With this arrangement it will be seen that when the permeable disk is pressed against the transverse wall of the cup 29 the fluid pressure within the tank is restricted to passage through an area of the disk corresponding substantially with the area of the vent opening 28. On the other hand, when the disk is flexed away from the transverse wall the air pressure acting on the disk acts upon a relatively large area thereof. By this means I obtain materially greater restriction against flow of air or liquid out of the tank through the vent opening 28, and a relatively freer flow of air into the tank through the vent opening.

The body or diaphragm 27 of permeable material may if desired be provided with one or more openings 30 therethrough in offset relation to the vent opening 28, such that when the diaphragm is flexed away from the transverse wall of the cup member 29 the flow of air into the tank may take place through these openings instead of through the pores or interstices of the permeable disk.

Figure 5:
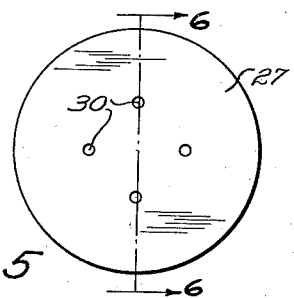
Fig. 5 is a detached plan view of the flow restricting permeable body.
Figure 6:
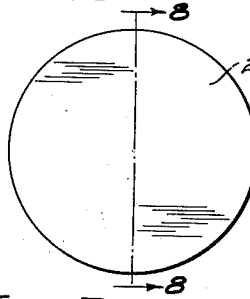
Fig. 6 is a transverse sectional view thereof on line 6—6 of Fig. 5.
Figures 7, 8:
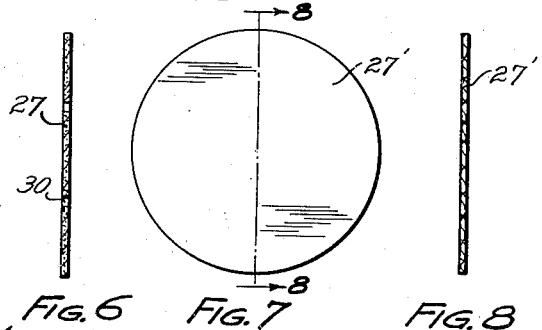
Figs. 7 and 8 are similar plan and sectional views, respectively, showing a fabric disk adapted to be used as such permeable body.

Instead of employing chamois skin as the porous or permeable vent control element, I may employ a body or disk 27' of suitable flexible fabric material as represented in Figs. 7 and 8. When fabric is employed as the vent control element a fabric of relatively low porosity may be selected and, in some instances, the desired flexibility and porosity may be obtained by suitable treatment of the fabric. If desired, the fabric disk 27' may also be provided with one or more openings similar to the openings 30 of the disk of Fig. 5, and on the other hand, it will be understood that in some instances I may omit the openings 30 of the chamois skin disk 27.

Figure 9:
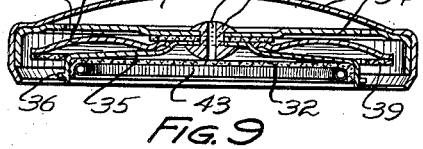
Fig. 9 is a transverse sectional view similar to Fig. 2 but showing another filler cap embodying my invention.

In Fig. 9 of the drawing I have shown a disk or diaphragm 32, of chamois skin or other permeable material, incorporated in a vented filler cap of a different character. The filler cap may have outer and inner body members 33 and 34 connected together by the outer member being crimped around the edge of the inner member. A locking member 35 of cup form and having laterally outwardly extending locking lugs 36 may be connected to the inner member 34, as by means of a hollow rivet 37. A resilient member 38 may be disposed between the inner member 34 and the cup member 35 to act on the gasket 39 to press the same against the outer end of a filler neck to which the cap may be applied. The passage 40 of the rivet 37 connects the interior of the tank to which the cap is applied with the vent chamber 41, and one or more openings 42 in the inner member 34 connect this vent chamber with the atmosphere.

According to my invention the disk or diaphragm 32 of permeable material may be retained in the cup member 35 so as to extend transversely of the vent opening 40 and to be movable into engagement with and away from the rivet 37 or other member in which such vent opening is formed. The member 32 may be retained in the cup member 35 as by means of a spring ring 43 which clamps edge portions of this member against portions of the cup member.

Figure 10:
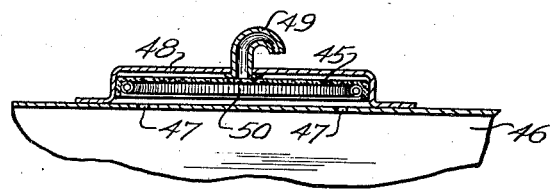
Fig. 10 is a transverse sectional view showing my improved venting means permanently applied to a liquid containing tank.

In Fig. 10 of the drawing I have shown a simpler embodiment of my invention wherein a disk or diaphragm 45 of permeable material controls a vent passage or opening leading from a liquid container or storage tank 46. In this construction the top wall of the tank is provided with an opening 47 over which a cup-like member 48 is disposed to provide a chamber which communicates with the tank through the opening 47. A vent pipe 49 or other hollow member connects this chamber with the atmosphere. The diaphragm or disk 45 of permeable material is disposed in the chamber of the cup member 48 to extend transversely of the vent passage in the pipe 49. The diaphragm may be retained in the cup member 48 by any suitable means such as the spring clamping ring 50. The permeable diaphragm is thus movable into engagement with and away from the inner end of the vent pipe and controls the passage of fluid therethrough.

From the foregoing description and the accompanying drawing it will now be readily understood that I have provided improved vent means for liquid and fuel containing tanks which provides for a relatively free flow of air into the tank but which provides material restriction against the flow of air or liquid out of the tank through the vent passage. It will be understood, furthermore, that my novel vent means comprises in part a body or diaphragm of permeable material through which the air or liquid must pass in flowing into or out of the tank. It will thus be seen that my novel vent means provides, in effect, a form of check valve which affords efficient venting of the fuel or storage tank but which also effectively prevents loss of fuel or other liquid through the vent passage.

While I have illustrated and described my improved vent device and filler cap in a somewhat detailed manner, it will be understood, of course, that the invention is not necessarily limited to the particular construction and use disclosed but may be embodied in various other arrangements and applied to other uses without departing from the spirit of the invention and the scope of the appended claims.

Having thus described my invention, I claim:

1. In a tank venting device, a member having a wall provided with a vent opening for connecting the interior of a tank with the atmosphere, and a sheet of permeable material on said member extending transversely of the vent opening, said sheet being movable away from, or into engagement with, said wall whereby flow of fluid out of the tank as the result of pressure therein takes place through a relatively small area of the sheet and flow into the tank under pressure of the atmosphere takes place through a relatively large area of the sheet.

2. In a tank venting device, a member having a wall provided with a vent opening for connecting the interior of a tank with the atmosphere, and a sheet of permeable material on said member extending transversely of the vent opening, said sheet being movable away from, or into engagement with, said wall and having an opening therethrough in offset relation to said vent opening whereby the flow of air into the tank may take place through said offset opening but flow of fluid out of the tank must take place through the permeable material of said sheet.

3. In a tank venting device, a member having a vent opening, and a permeable element movable relative to said member and providing a valve for the vent opening, said valve permitting in one position thereof a restricted flow out of the tank through a relatively small area of the permeable element and in another position a relatively freer flow into the tank through a relatively larger area of said permeable element.

4. In a tank venting device, a member having a vent opening, and a porous element movable against and away from said member and providing a valve for the vent opening, said valve permitting in one position thereof a restricted flow out of the tank through a relatively small area of the porous element and having an opening therethrough in offset relation to the vent opening and through which a relatively freer flow takes place into the tank when the valve is moved away from said member.

5. In a filler cap and vent device, a cap structure having a chamber therein and means forming a wall of said chamber and provided with a vent opening, and a sheet of permeable material extending across the vent opening, said sheet being connected with the cap structure but having at least a portion thereof movable into and out of engagement with said wall whereby a restricted flow out of the device takes place through a relatively small area of the permeable sheet when the latter is against the wall and a freer flow into the device takes place through a relatively larger area of the permeable sheet when the latter is moved away from said wall.

6. A filler cap comprising a cap structure having a member provided with a vent opening, and a disk of flexible permeable material extending across the vent opening, said disk having outer portions thereof connected with the cap structure whereby the disk is movable against and away from said member whereby a restricted flow out of the device takes place through a small area of the permeable disk when the latter is against said member and a freer flow into the device takes place through a relatively larger area of the permeable disk when the latter is moved away from said member.

CLARENCE W. SHAW.